(12) United States Patent
Pautis et al.

(10) Patent No.: US 11,780,599 B2
(45) Date of Patent: Oct. 10, 2023

(54) AIRCRAFT ENGINE PYLON HAVING A MOBILE COWL

(71) Applicant: Airbus Operations SAS, Toulouse (FR)

(72) Inventors: Olivier Pautis, Toulouse (FR); Jonathan Blanc, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/694,747

(22) Filed: Mar. 15, 2022

(65) Prior Publication Data

US 2022/0297845 A1 Sep. 22, 2022

(30) Foreign Application Priority Data

Mar. 17, 2021 (FR) ...................................... 2102641

(51) Int. Cl.
*B64D 29/02* (2006.01)
*B64D 27/26* (2006.01)
*B64D 29/08* (2006.01)

(52) U.S. Cl.
CPC ............. *B64D 29/02* (2013.01); *B64D 27/26* (2013.01); *B64D 29/08* (2013.01); *B64D 2027/264* (2013.01)

(58) Field of Classification Search
CPC ......... B64D 29/02; B64D 27/26; B64D 29/08
See application file for complete search history.

(56) References Cited

U.S. PATENT DOCUMENTS

| | | | | |
|---|---|---|---|---|
| 3,820,719 | A * | 6/1974 | Clark | F02K 1/09 239/265.31 |
| 4,442,987 | A * | 4/1984 | Legrand | F02K 1/72 244/110 B |
| 9,567,089 | B2 * | 2/2017 | Layland | B64D 27/26 |
| 2010/0107599 | A1 * | 5/2010 | Vauchel | B64D 29/08 244/110 B |
| 2016/0221682 | A1 | 8/2016 | Pautis et al. | |
| 2016/0363097 | A1 * | 12/2016 | Foutch | F02K 1/763 |
| 2019/0003421 | A1 * | 1/2019 | Pautis | F02K 1/763 |

(Continued)

FOREIGN PATENT DOCUMENTS

| | | |
|---|---|---|
| EP | 3103995 A2 | 12/2016 |
| EP | 3421771 A1 | 1/2019 |

(Continued)

OTHER PUBLICATIONS

French Search Report; priority document.

*Primary Examiner* — Christopher D Hutchens
*Assistant Examiner* — Steven J Shur
(74) *Attorney, Agent, or Firm* — Greer, Burns & Crain, Ltd.

(57) ABSTRACT

An engine pylon has a primary structure fastened between an engine and an aircraft wing and a cowling system having a front set of fixed cowls, a rear cowl, a displacement system having a first structure as one with the rear cowl and having a first slide mechanism, and a second structure fastened to a fixed structure of the wing and having second slide mechanism. The slide mechanisms cooperate so as to realize a sliding connection and to move the rear cowl in translation from an advanced position to a retracted position. An immobilizing system locks the rear cowl in the advanced position.

8 Claims, 4 Drawing Sheets

(56) References Cited

U.S. PATENT DOCUMENTS

2020/0025088 A1    1/2020  Geliot
2020/0072128 A1*  3/2020  Combes ................ B64D 29/06
2020/0122850 A1    4/2020  Labarthe et al.

FOREIGN PATENT DOCUMENTS

| EP | 3620388 A1 | 3/2020 |
| EP | 3647202 A1 | 5/2020 |
| FR | 3081837 A1 | 12/2019 |

* cited by examiner

AIRCRAFT ENGINE PYLON HAVING A MOBILE COWL

CROSS-REFERENCES TO RELATED APPLICATIONS

This application claims the benefit of the French patent application No. 2102641 filed on Mar. 17, 2021, the entire disclosures of which are incorporated herein by way of reference.

FIELD OF THE INVENTION

The present invention relates to an aircraft engine pylon having a mobile cowl allowing access to the inside of the engine pylon, and also an aircraft having a jet engine, a wing, and such an engine pylon for fastening the jet engine beneath the wing.

BACKGROUND OF THE INVENTION

An aircraft conventionally has an engine, for example a jet engine, which is fastened beneath a wing of the aircraft using an engine pylon. The engine pylon is constituted of a rigid structure that is fastened both to a structure of the wing and to a structure of the engine. The engine pylon allows the transmission of the forces generated by the engine to the structure of the wing, when the engine is running. The engine pylon also allows systems to pass between the wing and the engine, such as, for example, the electrical system, the hydraulic system, pneumatic system, etc.

In order to limit the drag of the engine pylon, it is covered with a set of cowls. The cowls are positioned next to one another so as to create a surface that is as smooth as possible, and are fastened either to the structure of the engine pylon or to the structure of the wing of the airplane.

In order to access the inside of the engine pylon, removable hatches are provided on some of these cowls. The hatches are fastened by threaded fasteners or rivets, and, after removal, a technician can access the inside of the engine pylon and thus perform maintenance on the elements that are present.

The fastening of the cowls requires the presence of a structure that is relatively rigid and therefore heavy. Furthermore, as a result of the manufacturing and assembly tolerances, a plurality of cowls cannot be juxtaposed next to one another without the appearance of space and discontinuity between these cowls. These spaces and discontinuities can cause disruption of the flow of the air and the occurrence of acoustic phenomena. Finally, the removal of the hatches does not allow easy access to the inside of the engine pylon and their presence makes it necessary to put in place local structural reinforcing elements.

SUMMARY OF THE INVENTION

An object of the present invention is thus to propose an engine pylon having a mobile cowl. Such a mobile cowl allows easy access to the engine pylon and to the systems that are included therein, in particular for maintenance and inspection tasks, and the structure supporting this mobile cowl is simplified with respect to a structure of the prior art. Furthermore, this mobile cowl can be made in one piece, which in turn reduces the disruption of the flow of the air and the occurrence of acoustic phenomena.

To this end, there is proposed an engine pylon of an aircraft having a wing with a fixed structure, the engine pylon having a primary structure intended to fasten an engine and the wing to each other, and a cowling system having:

a front set of cowls wherein the cowls are fastened around the primary structure, a rear cowl disposed in the continuation of and at the rear of the set of cowls, a displacement system having a first structure as one with the rear cowl and having first slide means, and a second structure intended to be fastened to the fixed structure of the wing and having second slide means, wherein the first slide means and the second slide means cooperate with one another so as to realize a sliding connection, so as to move the rear cowl in translation from an advanced position, in which the rear cowl is in the continuation of and at the rear of the set of cowls, to a retracted position, in which the rear cowl is moved away, towards the rear, from the set of cowls, and an immobilizing system alternately adopting a locked position in which it immobilizes the rear cowl in the advanced position, and an unlocked position in which it does not immobilize the rear cowl.

The presence of the mobile cowl, owing to its stowing/opening ability, ensures, inter alia, easy access to the inside of the engine pylon and to the systems that are housed therein.

Advantageously, the first slide means take the form of two parallel rails wherein each rail is fastened to the first structure, the second slide means take the form of two grooves made in the second structure, and each rail slides inside one of the grooves.

Advantageously, the cowling system has a plurality of positioning pegs distributed at the front of the first structure, and, for each positioning peg, the structure of the engine pylon has a recess in which the positioning peg is housed in the advanced position.

Advantageously, two of the positioning pegs are constituted by the front ends of the rails.

Advantageously, one positioning peg is fastened to the first structure in the bottom part thereof.

Advantageously, each cowl is constituted of just a single component.

Advantageously, the first structure has an upper spar that extends in a generally horizontal plane and that supports the first slide means, a lower spar that is positioned obliquely and extends upwards as it progresses from the front towards the rear, and a plurality of ribs that extend in generally vertical planes and that are fastened to the lower spar and to the upper spar.

The invention also proposes an aircraft having a wing, an engine and an engine pylon according to one of the preceding variants, fastened between the wing and the engine.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
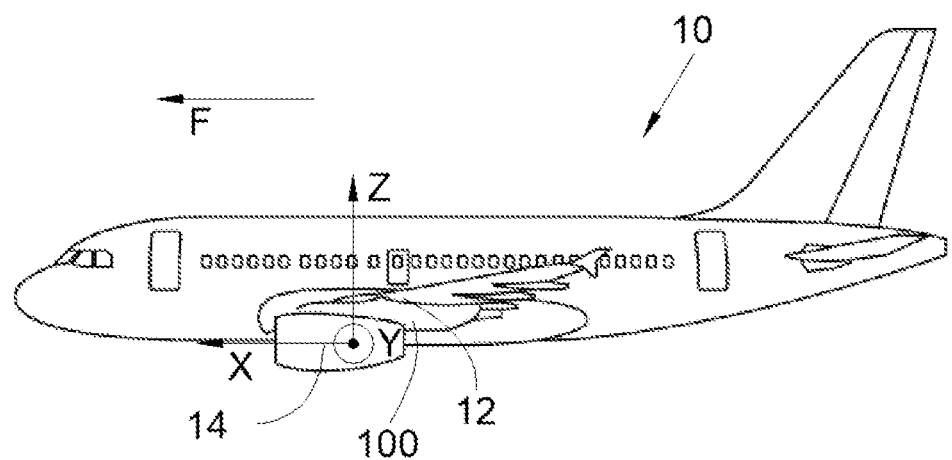
FIG. 1 is a side view of an aircraft according to the invention.

FIG. 1 shows an aircraft 10 that has an engine 14, for example a jet engine, and a wing 12 beneath which the engine 14 is fastened via an engine pylon 100 according to the invention.

In the following description, terms relating to a position are considered in relation to an aircraft 10 in a normal flight position, i.e., as shown in FIG. 1 and the "front" and "rear" positions are considered relative to the front and the rear of the engine 14 and relative to the direction of forward movement F of the aircraft 10 when the engine 14 is in operation.

In the following description, and by convention, the X direction is the longitudinal direction of the engine 14, which is parallel to the longitudinal axis of the jet engine, the Y direction is the transverse direction, which is horizontal when the aircraft 10 is on the ground, and the Z direction is the vertical direction, which is vertical when the aircraft 10 is on the ground, these three directions X, Y and Z being mutually orthogonal.

Figure 2:
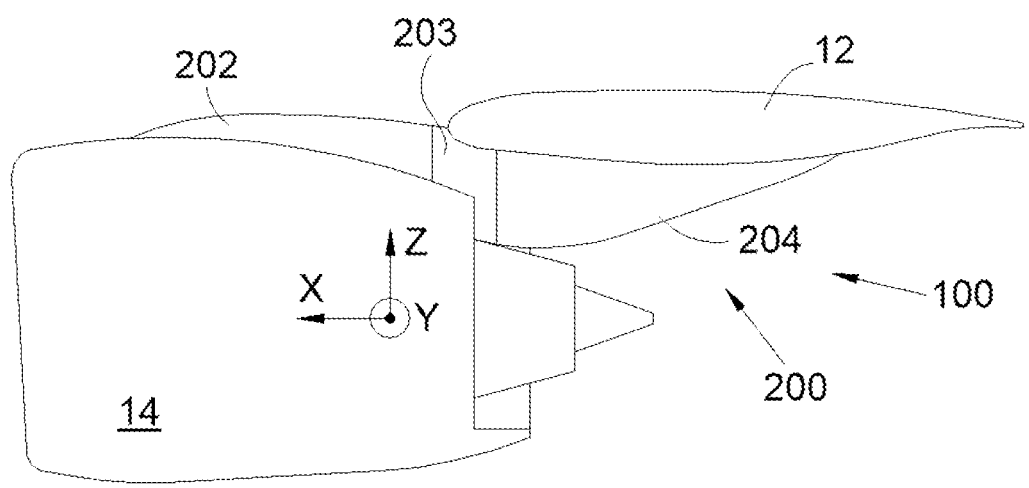
FIG. 2 is a side view of a propulsion assembly having an engine pylon according to the invention.

FIG. 2 shows the wing 12 and the engine 14 fastened to one another via the engine pylon 100 that has a front set of cowls 202, 203 and a rear cowl 204.

In the embodiment of the invention that is presented here, the front set of cowls has a front cowl 202 and an intermediate cowl 203 disposed at the rear of the front cowl 202, but in another embodiment the front cowl 202 and the intermediate cowl 203 can constitute just a single cowl.

The rear cowl 204 is disposed at the rear of the front set of cowls 202, 203.

In this case, the rear cowl 204 is disposed beneath the wing 12 and at the rear of the engine 14 and the front cowl 202 is disposed above the engine 14 and in front of the wing 12. The intermediate cowl 203 forms the junction between the front cowl 202 and the rear cowl 204.

Figure 3:
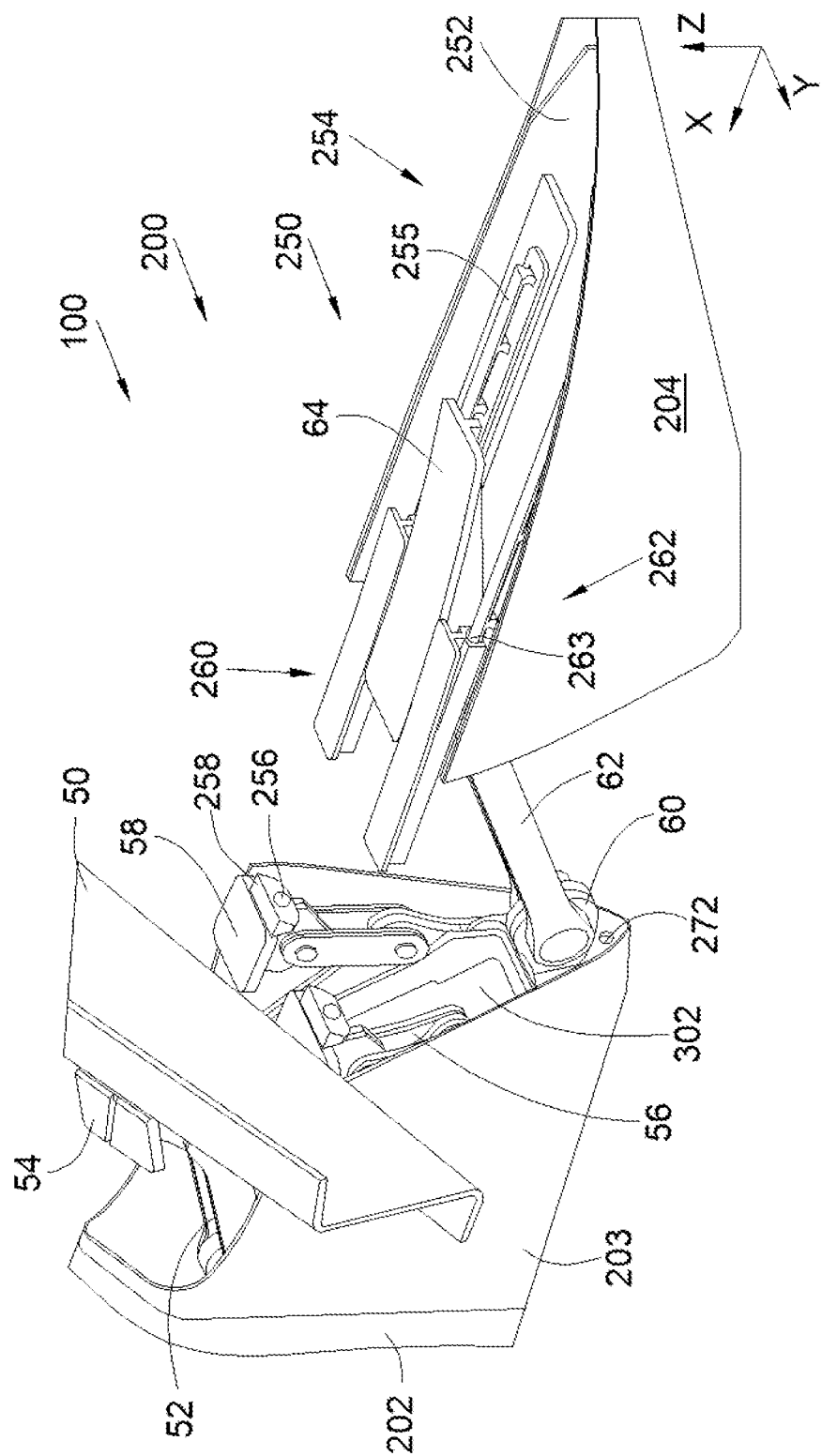
FIG. 3 is a perspective view of the engine pylon according to the invention, in the retracted and open position.
Figure 4:
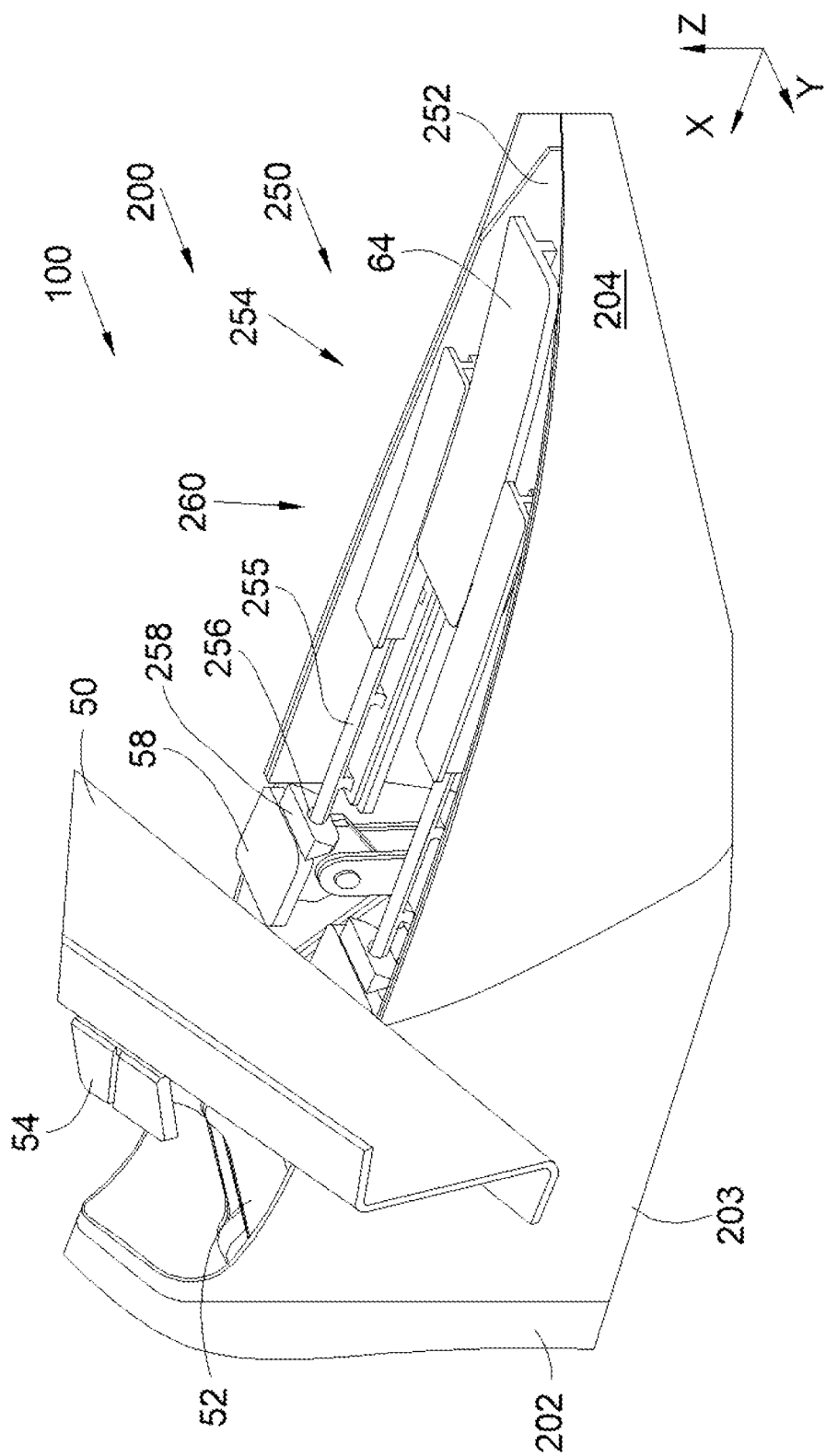
FIG. 4 is a perspective view of the engine pylon according to the invention, in the advanced and closed position.

FIG. 3 shows the engine pylon 100 with the rear cowl 204 in the open and retracted position, and FIG. 4 shows the engine pylon 100 with the rear cowl 204 in the closed and advanced position.

The engine pylon 100 comprises a rigid structure 302, also called primary structure, which is intended to fasten to each other a structure of the engine 14 and a structure of the wing 12, such as, in particular, the front spar 50 of the wing 12 that extends generally in the transverse direction Y.

The primary structure 302 supports the engine 14 via fastening means (not illustrated) that are disposed generally at the front and at the rear of the primary structure 302 and take, for example, the form of those disclosed in the document US-A-2016/0221682.

FIG. 3 and FIG. 4 show a particular embodiment of the structure of the engine pylon 100, but the invention described here can be implemented with an engine pylon 100 having a different design.

The primary structure 302 is embodied here by a rear rib.

In this case, the primary structure 302 is fastened to the wing 12, and more particularly in this case to the front spar 50, via two sets of upper shackles or links 52 of which only the port-side set 52 is visible here since the other is hidden by the front spar 50. Each set of upper shackles 52 is in this case fastened to the front spar 50 via a first support 54 fastened to the front spar 50.

The primary structure 302 is also fastened to the wing 12 via two sets of lower shackles or links 56. Each set of lower shackles 56 is, in this case, fastened to the wing 12 via a second support 58 fastened to the front spar 50 or to another structural element of the wing 12, such as the pressure-side panel.

The engine pylon 100 also has, at the rear of the primary structure 302, a rear clevis 60 as one with the primary structure 302. The primary structure 302 is fastened to the wing 12 via a rear rod 62 that connects, in use, the rear clevis 60 to the wing 12.

The rear rod 62 has a first end mounted in an articulated manner on the rear clevis 60 and a second end mounted in an articulated manner on a shoe 64 fastened to the wing 12, in particular at the pressure-side panel of the wing 12.

In the embodiment of the invention that is presented here, the cowls 202 and 203 of the front set of cowls 202, 203 are fastened around the primary structure 302, i.e., the primary structure 302 is housed at least in part in the front set of cowls 202, 203. In the particular embodiment presented here, the rear rod 62 is housed inside the rear cowl 204. Of course, depending on the design of the pylon 100, the arrangement may be different.

The front cowl 202 and the intermediate cowl 203 are fastened to the primary structure 302 by any appropriate fastening means such as, for example, support elements, fittings and held by means of threaded means or rivets.

The engine pylon 100 thus has a cowling system 200 that has the front set of cowls 202, 203 and the rear cowl 204.

The cowling system 200 also has a displacement system 250 that moves the rear cowl 204 in translation from a closed/advanced position, in which the rear cowl 204 is in contact, on its front face, with the intermediate cowl 203 and extends in the continuation of and at the rear of the front set of cowls 202, 203 and, more particularly in this case, the intermediate cowl 203, to an open/retracted position, in which the rear cowl 204 is retracted relative to its advanced position, so as to be moved away, towards the rear, from the front set of cowls 202, 203 and more particularly in this case from the intermediate cowl 203 and thus to free up a space between the front set of cowls 202, 203 and the rear cowl 204 so as to allow access to the inside of the engine pylon 100 and to the various systems that are housed therein (not shown in the figures in this file). The rear cowl 204 is thus a mobile cowl and the moving clear of the rear cowl 204 allows easy access compared with the hatches of the prior art. Furthermore, it is not necessary to provide access hatches, thus simplifying the structure relative to the prior art, such as, for example, with a "one-piece" external skin of the cowl, which is made in a single piece and promotes aerodynamic flow.

The cowling system 200 also has an immobilizing system, such as a lock or latch or a threaded fastener, which can alternately adopt a locked position in which it immobilizes the rear cowl 204 in the advanced position, and an unlocked position in which it does not immobilize the rear cowl 204 and leaves it free to pass from the advanced position to the retracted position and vice versa. In the unlocked position, the rear cowl 204 is therefore free to move in translation.

The immobilizing system makes it possible to fasten the rear cowl 204 to a fixed element of the pylon 100, such as, for example, the intermediate cowl 203 or the primary box 302.

Figure 5:
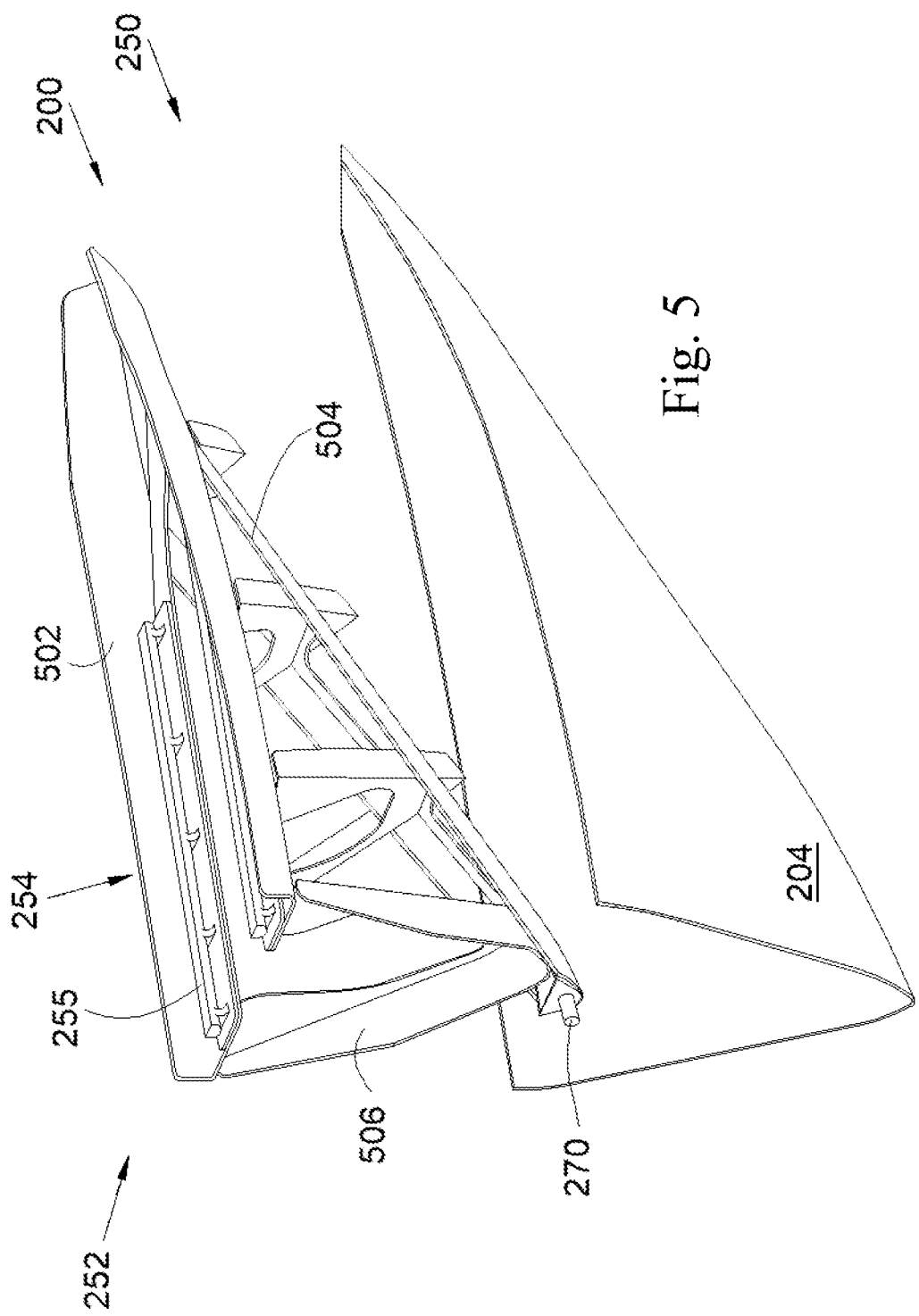
FIG. 5 is an exploded perspective view of a part of the engine pylon according to the invention.

FIG. 5 shows a part of the cowling system 200 in an exploded view.

The displacement system 250 has a first structure 252 as one with the rear cowl 204 and having first slide means 254, and a second structure 260 as one with the pressure-side panel of the wing 12 (not shown) having second slide means 262. The first slide means 254 and the second slide means 262 cooperate with one another so as to realize a sliding connection of which the translation direction is in this case parallel to the longitudinal direction X and so as to move the rear cowl 204 from the advanced position to the retracted position and vice versa.

The rear cowl 204 is fastened to the first structure 252 by any appropriate means such as threaded fasteners or rivets.

The second structure 260 is fastened to a fixed structure of the aircraft 10 such as for example a structure of the wing 12.

In the embodiment of the invention that is presented here, the first slide means 254 take the form of two rails 255 parallel to the translation direction with a semi-circular section. Each rail 255 is fastened to the first structure 252. The second slide means 262 take the form of two grooves 263 and each groove 263 is made in a block. The two blocks together form the second structure 260. Each rail 255 slides in the respective opposite groove 263 wherein each groove in this case takes the form of a cylindrical cutout inside which the rail 255 slides.

Of course, other complementary shapes are possible for realizing the sliding connection between a rail 255 and a groove 263.

Each block is fastened to the fixed structure of the wing 12 of the aircraft 10 and has its groove 263 downwards while each rail 255 is oriented upwards. The first structure 252 and the rear cowl 204 are thus suspended beneath the fixed structure, and therefore in this case beneath the wing 12. The rear cowl 204 thus slides beneath the wing 12.

In order to best avoid movements of the rear cowl 204 in flight (and thus ensure continuity of aerodynamic shape with the cowls 202 and 203), the cowling system 200 has a plurality of positioning pegs 270 distributed at the front of the first structure 252, and, for each positioning peg 270, the structure of the engine pylon 100 has a recess 256, 272 in which the positioning peg 270 is housed in the advanced position.

In the embodiment of the invention that is presented here, there are three positioning pegs, of which two are constituted by the front ends of the rails 255, wherein each end is housed in a recess 256.

Each recess 256 is, in this case, made in a pad 258 and each pad 258 is fastened either to the structure of the engine pylon 100 or to that of the wing 12 beneath the pressure-side panel (not shown).

Since the rails 255 are located in the top part of the rear cowl 204, another positioning peg 270 fastened to the first structure 252 is disposed in the bottom part thereof and a recess 272 is provided in the structure of the engine pylon 100 so as to house the positioning peg 270 in the advanced position.

Advantageously, each cowl 202, 203, 204 is constituted of just a single component that is, for example, produced by molding, thus limiting the presence of a junction zone that can disturb the flow of the air and generate noise.

In the embodiment of the invention that is presented in FIG. 5, the first structure 252 has an upper spar 502 that extends in a generally horizontal plane and that supports the first slide means 254, and a lower spar 504 that is positioned obliquely and extends upwards as it progresses from the front towards the rear.

The positioning peg 270 is in this case fastened to the front of the lower spar 504.

In order to fasten the lower spar 504 and the upper spar 502, the first structure 252 has a plurality of ribs 506 that extend in generally vertical planes and that are fastened to the lower spar 504 and to the upper spar 502.

The structure of the first structure 252 is thus relatively simple and lightweight.

In a preferred embodiment, using components made of composite materials, providing significant advantages in terms of mass, cost and integration of functions (complex shapes, reduced material losses, etc.) and assembly (adhesive bonding, common curing cycle, elimination of fastenings, etc.), is envisaged.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine pylon of an aircraft having a wing with a fixed structure, the engine pylon having a primary structure configured to fasten an engine and the wing to each other, and a cowling system having:
   a front set of cowls wherein cowls of the front set are fastened around the primary structure,
   a rear cowl disposed in a continuation of and at a rear of the front set of cowls,
   a displacement system having a first structure as one with the rear cowl and having first slide means, and a second structure configured to be fastened to the fixed structure of the wing and having second slide means, wherein the first slide means and the second slide means cooperate with one another so as to realize a sliding connection, so as to move the rear cowl in translation from an advanced position, in which the rear cowl is in the continuation of and at the rear of the front set of cowls, to a retracted position, in which the rear cowl is moved away, towards the rear, from the front set of cowls, and
   an immobilizing system alternately adopting a locked position in which the immobilizing system immobilizes the rear cowl in the advanced position, and an unlocked position in which the immobilizing system does not immobilize the rear cowl.

2. The engine pylon according to claim 1,
   wherein the first slide means comprises two parallel rails,
   wherein each rail is fastened to the first structure,
   wherein the second slide means comprises two grooves made in the second structure, and
   wherein each rail slides inside one of the grooves.

3. The engine pylon according to claim 2,
   wherein the cowling system has a plurality of positioning pegs distributed at a front of the first structure, and wherein, for each positioning peg, the primary structure of the engine pylon has a recess in which the positioning peg is housed in the advanced position.

4. The engine pylon according to claim 3, wherein two of the positioning pegs are constituted by front ends of the rails.

5. The engine pylon according to claim 4, wherein one of the two positioning pegs is fastened to the first structure in a bottom part of the first structure.

6. The engine pylon according to claim 1, wherein each cowl is constituted of just a single component.

7. The engine pylon according to claim 1, wherein the first structure has an upper spar that extends in a generally horizontal plane and that supports the first slide means, a lower spar that is positioned obliquely and extends upwards as the lower spar progresses from the front towards the rear, and a plurality of ribs that extend in generally vertical planes and that are fastened to the lower spar and to the upper spar.

8. An aircraft comprising:
   a wing,
   an engine, and
   an engine pylon having a primary structure configured to fasten an engine and the wing to each other, and a cowling system having:
      a front set of cowls wherein cowls of the front set are fastened around the primary structure,
      a rear cowl disposed in a continuation of and at a rear of the front set of cowls,
      a displacement system having a first structure as one with the rear cowl and having first slide means, and a second structure configured to be fastened to the fixed structure of the wing and having second slide means, wherein the first slide means and the second slide means cooperate with one another so as to realize a sliding connection, so as to move the rear cowl in translation from an advanced position, in which the rear cowl is in the continuation of and at the rear of the front set of cowls, to a retracted position, in which the rear cowl is moved away, towards the rear, from the front set of cowls, and
      an immobilizing system alternately adopting a locked position in which the immobilizing system immobilizes the rear cowl in the advanced position, and an unlocked position in which the immobilizing system does not immobilize the rear cowl,
   the engine pylon being fastened between the wing and the engine.

* * * * *